US008700720B2

(12) United States Patent
Chu et al.

(10) Patent No.: US 8,700,720 B2
(45) Date of Patent: Apr. 15, 2014

(54) SYSTEM ARCHITECTURE FOR LINKING PACKET-SWITCHED AND CIRCUIT-SWITCHED CLIENTS

(75) Inventors: Frank J. Chu, Cupertino, CA (US); Katherine W. Kwan, San Jose, CA (US)

(73) Assignee: Paltalk Holdings, Inc., New York, NY (US)

( * ) Notice: Subject to any disclaimer, the term of this patent is extended or adjusted under 35 U.S.C. 154(b) by 144 days.

(21) Appl. No.: 13/313,360

(22) Filed: Dec. 7, 2011

(65) Prior Publication Data

US 2012/0176943 A1    Jul. 12, 2012

Related U.S. Application Data

(63) Continuation of application No. 12/660,165, filed on Feb. 22, 2010, now Pat. No. 8,078,680, which is a continuation of application No. 10/072,175, filed on Feb. 7, 2002, now Pat. No. 7,668,916.

(60) Provisional application No. 60/266,854, filed on Feb. 7, 2001.

(51) Int. Cl.
   *H04M 3/56* (2006.01)

(52) U.S. Cl.
   USPC ............ 709/206; 709/205; 709/204; 709/207

(58) Field of Classification Search
   CPC .... H04M 3/56; H04M 3/562; H04L 12/1822; H04L 65/403; G06F 15/16
   See application file for complete search history.

(56) References Cited

U.S. PATENT DOCUMENTS

| | | | |
|---|---|---|---|
| 6,026,087 A | 2/2000 | Mirashrafi et al. |
| 6,134,235 A | 10/2000 | Goldman et al. |
| 6,137,869 A | 10/2000 | Voit et al. |
| 6,332,153 B1 | 12/2001 | Cohen |
| 6,339,593 B1 | 1/2002 | Kikinis |
| 6,353,660 B1 | 3/2002 | Burger et al. |
| 6,594,269 B1 | 7/2003 | Polcyn |
| 6,600,733 B2 | 7/2003 | Deng |

(Continued)

FOREIGN PATENT DOCUMENTS

WO    WO 0228013 A2 *   4/2002

OTHER PUBLICATIONS

Ravi Jain, Farooq M. Anjum, Paolo Missier, and Subramanya Shastry, Telcordia Technologies Inc., titled "Java Call Control, Coordination, and Transactions", presented in Communications Magazine, IEEE, vol. 38, No. 1, pp. 108,114, Jan. 2000 doi: 10.1109/35.815460.*

Huitema, C.; Cameron, J.; Mouchtaris, P.; Smyk, D., titled "An Architecture for Residential Internet Telephony Service", Network, IEEE, vol. 13, No. 3, pp. 50 to 56, May/Jun. 1999, doi: 10.1109/65.767139.*

(Continued)

*Primary Examiner* — Andrew Lai
*Assistant Examiner* — Hoyet H Andrews
(74) *Attorney, Agent, or Firm* — Ward & ZInna, LLC

(57) ABSTRACT

A method and computer program product which allows both phone-based and IP-based clients to participate in a single audio conference. The method enables at least two multipoint control units (MCUs) (i.e., conferencing servers) to connect via a standard data linkage (i.e., full-duplex dial-up or IP link). The method and computer program product enables the phone-based MCU to handle the phone clients and the IP-based MCU to handle the IP-based clients, while connecting the two to allow each participating client to hear all other participating clients.

4 Claims, 3 Drawing Sheets

(56) References Cited

U.S. PATENT DOCUMENTS

| | | | |
|---|---|---|---|
| 6,614,781 B1* | 9/2003 | Elliott et al. | 370/352 |
| 6,671,262 B1 | 12/2003 | Kung et al. | |
| 6,839,416 B1 | 1/2005 | Shaffer | |
| 6,839,734 B1 | 1/2005 | Vega-Garcia et al. | |
| 6,885,658 B1 | 4/2005 | Ress et al. | |
| 6,940,971 B1 | 9/2005 | Goldstein | |
| 6,950,441 B1* | 9/2005 | Kaczmarczyk et al. | 370/467 |
| 7,113,515 B2* | 9/2006 | Hoffman | 370/401 |
| 7,145,900 B2* | 12/2006 | Nix et al. | 370/352 |
| 7,164,913 B1* | 1/2007 | Dantu et al. | 455/436 |
| 7,173,925 B1* | 2/2007 | Dantu et al. | 370/352 |
| 7,251,218 B2* | 7/2007 | Jorgensen | 370/235 |
| 7,286,530 B2* | 10/2007 | Lupper et al. | 370/389 |
| 7,457,249 B2* | 11/2008 | Baldwin et al. | 370/237 |
| 7,477,638 B1* | 1/2009 | Kumar et al. | 370/356 |
| 7,496,056 B2* | 2/2009 | Ohrstrom Sandgren et al. | 370/260 |
| 7,606,216 B2* | 10/2009 | Lobig | 370/352 |
| 7,606,217 B2* | 10/2009 | Bender et al. | 370/352 |
| 7,675,934 B2* | 3/2010 | Sylvain | 370/466 |
| 2002/0091769 A1 | 7/2002 | Drozdzewicz et al. | |
| 2003/0043787 A1* | 3/2003 | Emerson, III | 370/352 |
| 2003/0088619 A1 | 5/2003 | Boundy | |
| 2004/0003045 A1 | 1/2004 | Tucker et al. | |
| 2004/0083266 A1 | 4/2004 | Comstock et al. | |
| 2004/0085913 A1 | 5/2004 | Baxley et al. | |
| 2005/0025073 A1 | 2/2005 | Kwan | |
| 2013/0070757 A1* | 3/2013 | Elliott et al. | 370/352 |

OTHER PUBLICATIONS

Greene, N.; Ramalho, M.; Rosen, B.; titled "Media Gateway Control Protocol Architecture and Requirements", Network Working Group, Request for Comments: 2805, pp. 01 to 45, Apr. 2000.*

Taylor, T., "Megaco/H.248: a new standard for media gateway control," Communications Magazine, IEEE , vol. 38, No. 10, pp. 124,132, Oct. 2000, doi: 10.1109/35.874979.*

Fei Lu; Heng Nie; Xiaoming Ding, "A realization scheme of User Gateway," Signal Processing Proceedings, 2000. WCCC-ICSP 2000. 5th International Conference on , vol. 3, no., pp. 2054,2057 vol. 3, 2000, doi: 10.1109/ICOSP.2000.893509.*

Oono, T.; Tanaka, T., "The proposal of wireless multimedia communication system with integration of packet-switched and circuit-switched channels," Global Telecommunications Conference, 1998. GLOBECOM 1998. The Bridge to Global Integration. IEEE , vol. 1, no., pp. 120,125 vol. 1, 1998, doi: 10.1109/GLOCOM.1998. 775710.*

Greene, N.; Ramalho, M.; Rosen, B.; (Greene et al.), titled "Media Gateway Control Protocol Architecture and Requirements" (Greene hereinafter), Network Working Group, Request for Comments: 2805, pp. 01 to 45, Apr. 2000.*

Huitema, C.; Cameron, J.; Mouchtaris, P.; Smyk, D., (Huitema et al.), titled "An Architecture for Residential Internet Telephony Service" (Huitema hereinafter), Network, IEEE, vol. 13, No. 3, pp. 50 to 56, May/Jun. 1999, doi: 10.1109/65.767139.*

Ravi Jain, Farooq M. Anjum, Paolo Missier, and Subramanya Shastry, Telcordia Technologies Inc., (Jain et al.), titled "Java Call Control, Coordination, and Transactions" (Jain hereinafter), presented in Communications Magazine, IEEE , vol. 38, No. 1, pp. 108,114, Jan. 2000 doi: 10.1109/35.815460.*

* cited by examiner

SYSTEM ARCHITECTURE FOR LINKING PACKET-SWITCHED AND CIRCUIT-SWITCHED CLIENTS

CROSS-REFERENCE TO RELATED APPLICATIONS

This application is a continuation application of Non-Provisional application Ser. No. 12/660,165, filed Feb. 22, 2010, which is a continuation application of Non-Provisional application Ser. No. 10/072,175, filed Feb. 7, 2002, now U.S. Pat. No. 7,668,916, which claims the benefit of Provisional Application Ser. No. 60/266,854, filed Feb. 7, 2001, the entire contents of the entire chain of applications is herein incorporated by reference.

FIELD OF THE INVENTION

The present invention relates generally to computer-based telephony networks and more particularly to software and servers that manage telephony conferencing.

BACKGROUND OF THE INVENTION

In today's technological environment, many ways exist for several people in multiple geographic locations to communicate with one another simultaneously. One such way is audio conferencing. Audio conferencing applications serve both the needs of business users and leisure users who are geographically distributed.

Traditional audio conferencing involved a central conferencing server which hosted an audio conference. Participants used their telephones to dial in to the conferencing server over the Public Service Telephone Network (PSTN) (also called the Plain Old Telephone System (POTS)).

Greater availability of low-cost personal computers, networking equipment, telecommunications, and related technology, however, has dramatically changed the way people communicate. One example of such change is the tremendous increase in persons connected to the global Internet. Connectivity achieved by the Internet—connecting numerous, different types of networks—is based upon a common protocol suite utilized by those computers connecting to it. Part of the common protocol suite is the Internet Protocol (IP), defined in Internet Standard (STD) 5, Request for Comments (RFC) 791 (Internet Architecture Board). IP is a network-level, packet (i.e., a unit of transmitted data) switching protocol.

In recent years, technological improvements offer the possibility of transmitting voice data over the worldwide public Internet. Voice over IP (VoIP) began with computer scientists experimenting with exchanging voice using personal computers (PCs) equipped with microphones, speakers, and sound cards.

VoIP further developed when, in March of 1996, the International Telecommunications Union-Telecommunications sector (ITU-T), a United Nations organization, adopted the H.323 Internet Telephony Standard. Among its specifications, H.323 provides the minimum standards that equipment must meet in order to send voice over the IP, and other packet-switched network protocols where quality of sound cannot be guaranteed. Thus, conferencing servers (also called multipoint control units (MCUs)) were developed to host audio conferences where participants connected to a central MCU using PC-based equipment and the Internet, rather than traditional phone equipment.

More recently, several alternatives to H.323 have been developed. One such alternative is the Session Initiation Protocol (SIP) developed within the Internet Engineering Task Force (IETF) Multiparty Multimedia Session Control (MMUSIC) Working Group. SIP, which is well-known in the relevant art(s), is a signaling protocol for Internet conferencing and telephony. SIP addresses users using an e-mail-like address and utilizes a portion of the infrastructure used for Internet e-mail delivery. It handles basic setup functions as well as enhanced services (e.g., call forwarding).

Given the rapid pace of development in the telephony industry—both in protocols and equipment—and the existence of both legacy equipment and protocols (e.g., telephones and switching networks such as the PSTN), audio conferencing service providers need a means to link legacy circuit-switched systems to newer packet-switched systems in order to reach (or service) a broader range of clients and vice versa. Therefore, a method is needed to seamlessly link a combination of MCU architectures for packet based (e.g., IP-based) client and circuit switched (e.g., phone) based client conferencing. The linkage of this combination of MCUs should realize the capabilities of the various participants' equipment and provide the appropriate audio data to each participant.

SUMMARY OF THE INVENTION

The present invention is directed to a method that meets the above-identified needs, whereby packet switched (e.g., Internet Protocol (IP)) based clients (e.g., PC clients) and circuit switched (e.g., phone) clients can simultaneously participate in a single audio conference application.

In an embodiment of the present invention, the method and computer program product of the present invention include the steps of establishing a connection between a packet-switched (e.g., IP-based) conferencing server (also called multipoint control unit (MCU)) and a circuit-switched (e.g., phone-based) conferencing server and designating that connection as continuously active on each server. As used herein, the packet based MCU may be referred to as the "IP MCU," which is one example of a packet based MCU. Likewise, the circuit switched MCU may be referred to as the "Phone MCU," which is one example of a circuit switched MCU.

Upon connection, the IP MCU designates the connection as an active speaker (i.e., participant who is actually speaking rather than simply listening), thereby ensuring that the audio data of actively speaking phone-based clients is later distributed to the IP-based clients connected to the IP MCU.

Next, the IP MCU receives a mixed and converted (mix of the audio streams of active speakers connected to the Phone MCU, that has been converted to an audio packet) phone client audio packet from the Phone MCU via the continuously active connection. Upon receipt of this audio packet, the IP MCU treats this packet as an active speaker packet and includes it in the active speaker mix for all its IP clients. Both the IP MCU and the Phone MCU perform an "echo suppression" during the sending of packets so that each client, if they are an active speaker, will not hear themselves speaking.

Next, asynchronously and simultaneously, the IP MCU receives audio packets from the actively speaking IP based clients connected to the IP MCU. The IP MCU forwards the mix of the active speakers to the Phone MCU via the continuously active connection. The Phone MCU treats this connection like just another active speaker Phone client. Because there is echo suppression where each active speaker will get a mix of all active speakers except themselves, the active speaker mix from the Phone MCU will not be forwarded back to itself. Likewise, the active speaker mix from the IP MCU going to the Phone MCU will not be forwarded back to itself because of echo suppression.

Upon completion of the steps above, the process begins again as long as the continuously active connection between the two MCUs remains active. That is, the process continues until either the Phone MCU or the IP MCU ceases hosting the audio conference (i.e., the conference is terminated).

In an alternate embodiment, the method and computer program product of the present invention include the steps of establishing a connection between a Phone MCU and an IP MCU and designating that connection as an active speaker on each server. This embodiment is similar to the embodiment first described above, except that the connection is now initiated by the Phone MCU rather than the IP MCU.

Once the connection is established between the Phone MCU and IP MCU, the Phone MCU designates this connection as continuously active, thereby ensuring that the audio data of actively speaking IP-based clients is later distributed to the phone-based clients connected to the Phone MCU.

Next, asynchronously and simultaneously, the Phone MCU receives a mixed (mix of the audio packets of active speakers connected to the IP MCU) IP-based client audio packet from the IP MCU via the continuously active connection. Upon receipt of this audio packet, the Phone MCU converts this audio packet into an audio stream (i.e., an audio format that phone-based clients can receive) and sends the audio stream to each connected phone-based client connected to the Phone MCU. Again, both the IP MCU and the Phone MCU perform an "echo suppression" during the sending of packets and audio streams so that each client, if they are an active speaker, will not hear themselves speaking.

Next, the Phone MCU receives audio streams from the actively speaking Phone-based clients connected to the Phone MCU. The Phone MCU then converts (i.e., analog to digital conversion) these audio streams into audio packets. Then the Phone MCU forwards these packets to the IP MCU via the continuously active connection.

Upon completion of the steps above, the process begins again as long as the continuously active connection between the two MCUs remains active. Thus, the process continues until either the Phone MCU or the IP MCU ceases hosting the audio conference (i.e., the conference is terminated).

With respect to both embodiments described above, an alternative embodiment of the present invention includes a gateway to bridge the time division multiplexing (TDM) connectivity on the Phone MCU (e.g. PRI lines) to packet connections on the IP MCU. This gateway would be necessary when the transport between the Phone and IP MCUs are different (e.g. H323 ethernet packets for the IP MCU and a PRI digital phone line for the Phone MCU).

An advantage of the present invention is that it enables simultaneous audio conferencing between clients using multiple types of equipment and protocols.

Another advantage of the present invention is that service providers can continue to support their existing clients using either traditional phone services and IP-based connections, while offering the added convenience of simultaneously linking additional clients using other types of equipment and protocols.

Further features and advantages of the invention as well as the structure and operation of various embodiments of the present invention are described in detail below with reference to the accompanying drawings.

BRIEF DESCRIPTION OF THE DRAWINGS

The features and advantages of the present invention become more apparent from the detailed description set forth below when taken in conjunction with the drawings in which like reference numbers indicate identical or functionally similar elements. Additionally, the left-most digit of a reference number identifies the drawing in which the reference number first appears.

DETAILED DESCRIPTION OF THE INVENTION

I. System Architecture Overview

The present invention is directed to a system and method that enables communication (i.e., audio conferencing) between a linked packet-switched server architecture for Internet Protocol (IP)-based clients and a circuit-switched server architecture for phone-based clients. In a preferred embodiment of the present invention, a service provider supplies the linkage infrastructure (i.e., full duplex dial-up or IP link), agreement terms, and facilities so that clients (i.e., participants) who subscribe to their conferencing services can take part in a multi-party audio conference application. The service provider would also provide customer, service, support, and billing as will be apparent to one skilled in the relevant art(s) after reading the description herein. Clients would connect to their respective servers using whatever equipment and protocol they currently have access to, and the invention would provide seamless linkage among the various clients.

Figure 1:
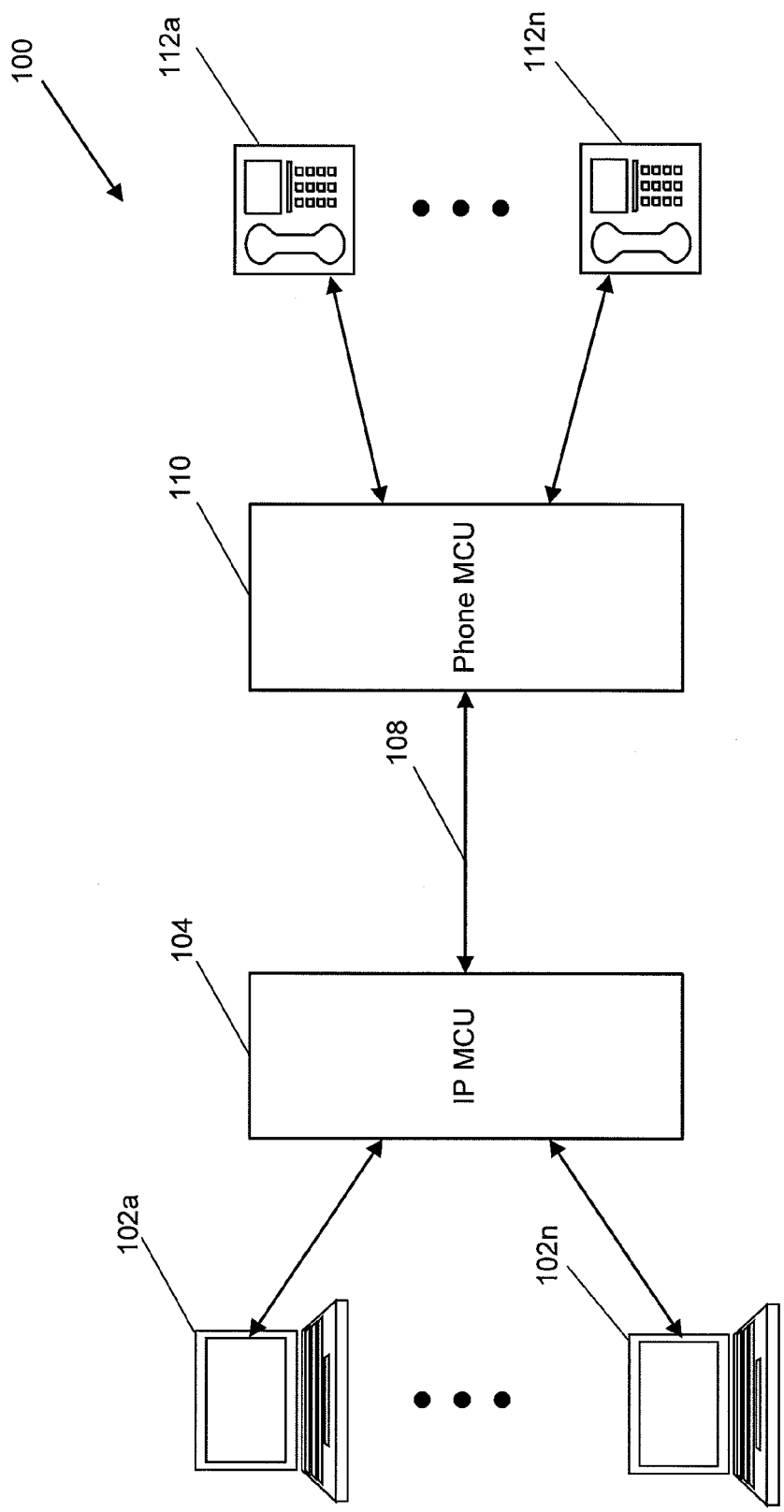
FIG. 1 is a block diagram illustrating the overall system architecture of an embodiment of the present invention, showing connectivity among the various components.

Referring to FIG. 1, a block diagram illustrating the system architecture of an embodiment of the present invention, showing connectivity among the various components, is shown. More specifically, FIG. 1 illustrates a linked multi-point control unit (MCU) architecture 100 for packet-switched (IP-based) personal computer system clients and circuit-switched (phone-based) client conferencing.

Architecture 100 includes a plurality of PC-based clients 102 (shown as clients 102*a*-102*n*) which connect to an IP-based MCU 104. Architecture 100 also includes a plurality of telephone-based clients 112 (shown as clients 112*a*-112*n*) which connect to a phone-based MCU 110. The connection between IP MCU 104 and phone MCU 110 is provided by a full-duplex client channel 108.

Full-duplex client channel 108 enables a service provider to send and receive audio packets from PC-based clients 102 using, for example, the SIP protocol. Full-duplex client channel 108 also enables a service provider to send and receive, for example, H.323 protocol packets from telephone-based clients 112. The client channel 108 looks like just another active speaker to both the IP MCU 104 and the Phone MCU 110. In an embodiment of the present invention, because the transport may be different (e.g. H323 ethernet packets for the IP MCU 104, and a PRI digital phone line for the Phone MCU 110), the client channel 108 may go through a protocol converter or gateway.

The present invention is described in terms of the above example. This is for convenience only and is not intended to limit the application of the present invention. In fact, after reading the following description, it will be apparent to one skilled in the relevant art(s) how to implement the following invention in alternative embodiments (e.g., MCUs 104 and 10 handling protocols other than those illustrated herein).

The terms "client," "subscriber," "party," "participant," and the plural form of these terms may be used interchangeably throughout herein to refer to those who would access, use, and/or benefit from the system and method of the present invention.

II. Operational Flow

Figure 2:
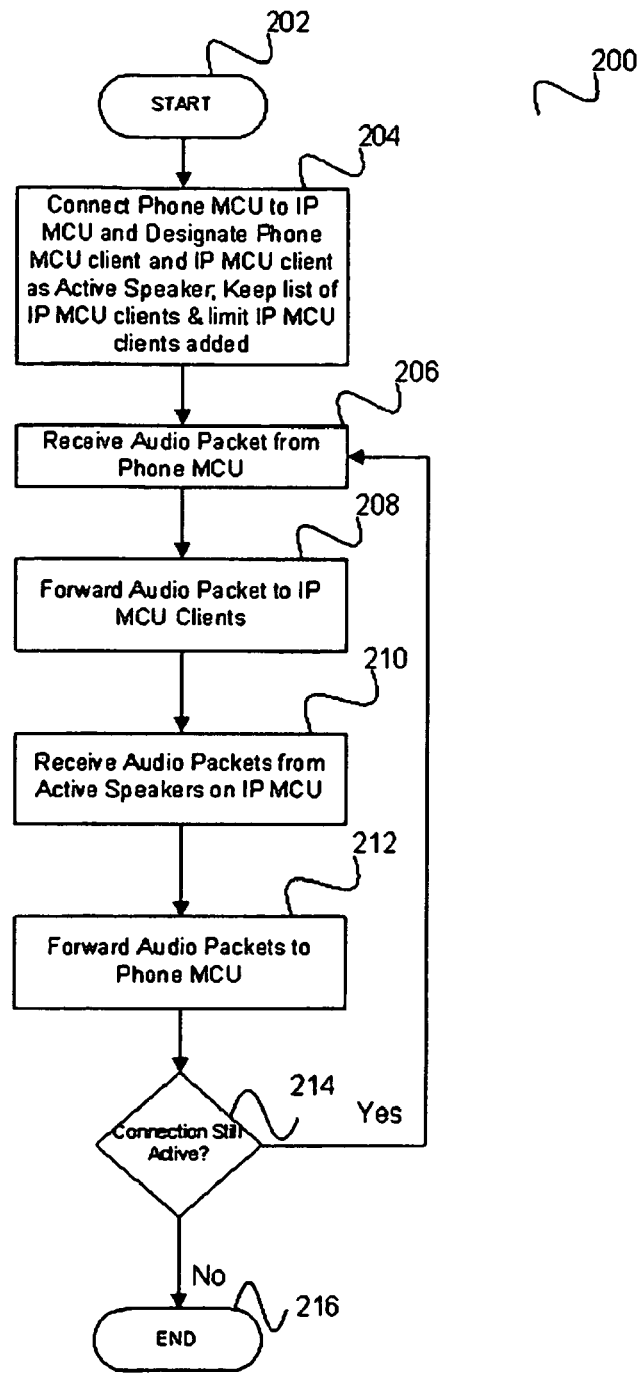
FIG. 2 is a flowchart representing the general operational flow according to an embodiment of the present invention.

Referring to FIG. 2, a flowchart representing the general operational flow, according to an embodiment of the present invention, is shown. More specifically, FIG. 2 depicts an example control flow 200 involved in providing a linked Internet Protocol (IP)-based client and phone-based client audio conference. In this embodiment, the IP multipoint control unit (MCU) 104 performs the initial steps necessary to establish a link to the Phone MCU 110.

Control flow 200 begins at step 202 with control passing immediately to step 204. In step 204, IP MCU 104 establishes a continuously active connection 108 to Phone MCU 110. Connection 108 is established as continuously active (i.e., recognized as active speaker by IP MCU 104), thereby ensuring that the audio data of actively speaking (e.g., participants who are actually speaking rather than simply listening) phone-based clients 112 is always included in the audio stream later distributed to the connected IP-based clients 102. IP MCU 104 also keeps an active speaker list so that it can limit the number of actively speaking IP-based clients 102 recognized and added to the stream, thus ensuring that the list does not become too large. If the number of actively speaking IP-based clients 102 becomes too large, the data being sent by the IP MCU 104 to every participant in the audio conference will be unintelligible (i.e., too many participants speaking on top of each other).

Returning to control flow 200, in step 206, the IP MCU 104 receives a mixed and converted phone client audio packet from the Phone MCU 110 via the continuously active connection 108. Upon receipt of this audio packet, in step 208, the IP MCU 104 sends the mixed and converted phone client audio packet to each connected PC client 102 connected to IP MCU 104.

In step 210 the IP MCU 104 receives PC client 102 audio packet(s) from each actively speaking PC client 102 connected to IP MCU 104. Upon receipt of PC audio packet(s), in step 212, the IP MCU 104 forwards the actively speaking PC client audio packet(s) to the Phone MCU 110 via the continuously active connection 108.

In step 214, the process begins again if the continuously active connection 108 is still active. Thus, control flow 200 continues until either the Phone MCU 110 or the IP MCU 104 ceases hosting the audio conference (i.e., the conference is terminated) as indicated by step 216.

It should be noted, as will be apparent to one skilled in the relevant art(s) after reading the description here. that control flow 200 as presented in FIG. 2 assumes that there is an order to the Phone MCU mixing and the IP MCU forwarding packets. This is done for ease of explanation herein, whereas, in actuality, these events are asynchronous and simultaneous as suggested above. Further, as will also be apparent to one skilled in the relevant art(s), there may some delay between an active speaker becoming active on one MCU, and before that active speaker is heard on the other MCU, but it is symmetric.

Figure 3:
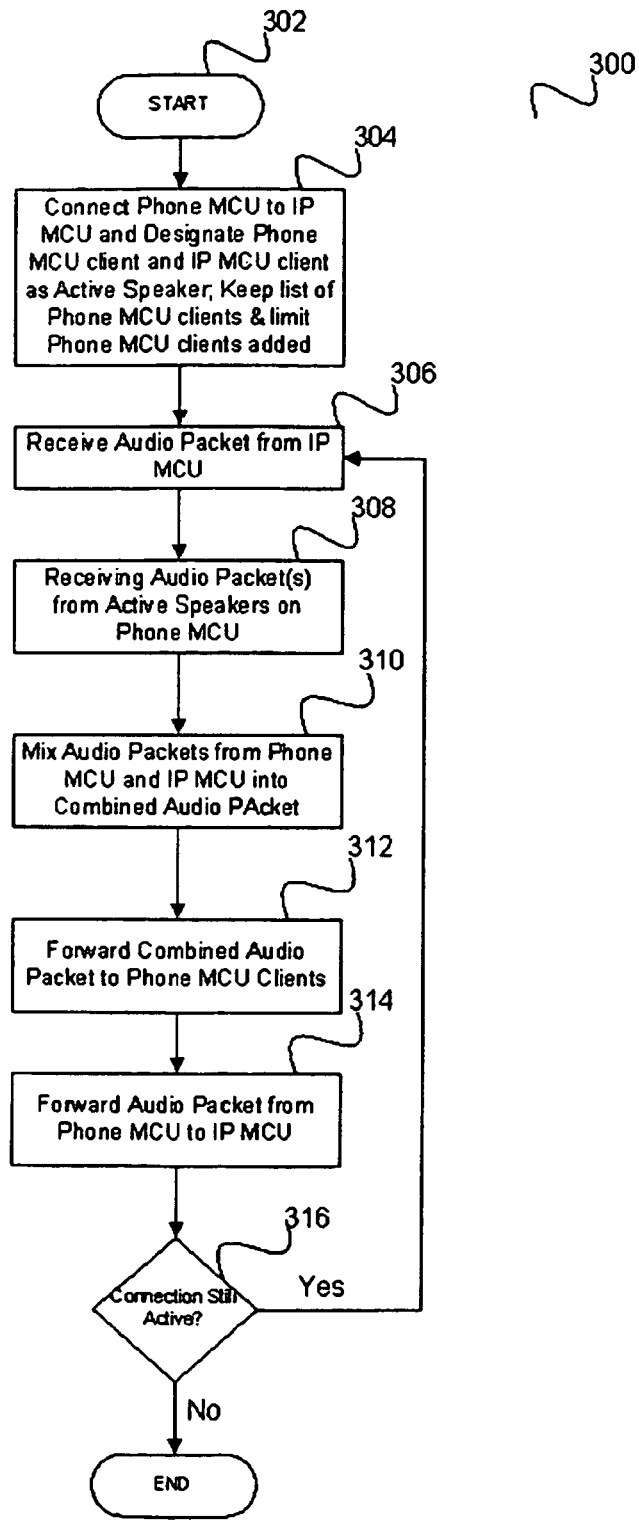
FIG. 3 is a flowchart representing the general operational flow according to another embodiment of the present invention.

Referring to FIG. 3, a flowchart representing the general operational flow, according to an embodiment of the present invention, is shown. More specifically, FIG. 3 depicts an example control flow 300 involved in providing a linked IP-based client and phone-based client audio conference. In this embodiment, the Phone multipoint control unit (MCU) 110 performs the initial steps necessary to establish a link to the IP MCU 104.

Control flow 300 begins at step 302 with control passing immediately to step 304. In step 304, the Phone MCU 110 establishes a continuously active connection 108 to IP MCU 104. Connection 108 is established as continuously active (i.e., recognized as active speaker by Phone MCU 110). thereby ensuring that the audio data of actively speaking (e.g., participants who are actually speaking rather than simply listening) IP-based clients 102 is always included in the audio mix later distributed to the connected phone-based clients 112. Phone MCU 110 also keeps an active speaker list so that it can limit the number of actively speaking phone-based clients 112 recognized and added to the mix, thus ensuring that the list does not become too large. If the number of actively speaking phone-based clients 112 becomes too large, the data being sent by the Phone MCU 110 to every participant in the audio conference will be unintelligible (i.e., too many participants speaking on top of each other).

Returning to control flow 300, in step 306, the Phone MCU 110 receives a mixed PC client audio packet from the IP MCU 104 via the continuously active connection 108. In step 308, the Phone MCU 110 receives an audio packet from each actively speaking phone client 112 connected to Phone MCU 110. Upon receipt of the actively speaking phone client audio packet, in step 310, the Phone MCU mixes the mixed PC client audio packet, received in step 306, with the actively speaking phone client audio packet, received in step 308, into a combined audio packet.

In step 312, the Phone MCU 110 forwards the combined audio packet to phone clients 112 connected to Phone MCU 110. In step 314 the Phone MCU forwards the audio packet, received in step 308, to the IP MCU 104 via the continuously active connection 108.

In step 316, the process begins again if the continuously active connection 108 is still active. Thus, control flow 300 continues until either the Phone MCU 110 or the IP MCU 104 ceases hosting the audio conference (i.e., the conference is terminated) as indicated by step 318.

It should be noted, as will be apparent to one skilled in the relevant art(s) after reading the description here, that control flow 300 as presented in FIG. 3 assumes that there is an order to the Phone MCU mixing and the IP MCU forwarding packets. This is done for ease of explanation herein, whereas, in actuality, these events are asynchronous and simultaneous as suggested above. Further, as will also be apparent to one skilled in the relevant art(s), there may some delay between an active speaker becoming active on one MCU, and before that active speaker is heard on the other MCU, but it is symmetric.

III. Environment

The present invention (i.e., architecture 100, control flow 200, control flow 300, or any part thereof) may be implemented using hardware, software or a combination thereof and may be implemented in one or more computer systems or other processing systems. In fact, in one embodiment, the invention is directed toward one or more computer systems capable of carrying out the functionality described herein.

An example of a computer system. The computer system represents any single or multi-processor computer. The computer system includes one or more processors, such as processor. The processor is connected to a communication infrastructure (e.g., a communications bus, cross-over bar, or network). Various software embodiments are described in terms of this exemplary computer system. After reading this description, it will become apparent to a person skilled in the relevant art how to implement the invention using other computer systems and/or computer architectures.

The computer system may include a display interface that forwards graphics, text, and other data from the communication infrastructure (or from a frame buffer not shown) for display on the display unit.

The computer system also includes a main memory, preferably random access memory (RAM), and may also include a secondary memory. The secondary memory may include, for example, a hard disk drive and/or a removable storage drive, representing a floppy disk drive, a magnetic tape drive, an optical disk drive, etc. The removable storage drive reads from and/or writes to a removable storage unit in a well-known manner. Removable storage unit, represents a floppy disk, magnetic tape, optical disk, etc. which is read by and written to by removable storage drive. As will be appreciated, the removable storage unit includes a computer usable storage medium having stored therein computer software and/or data.

In alternative embodiments, secondary memory may include other similar means for allowing computer programs or other instructions to be loaded into computer system. Such means may include, for example, a removable storage unit and an interface. Examples of such may include a program cartridge and cartridge interface (such as that found in video game devices), a removable memory chip (such as an EPROM, or PROM) and associated socket, and other removable storage units and interfaces, which allow software and data to be transferred from the removable storage unit to computer system.

The computer system may also include a communications interface. The communications interface allows software and data to be transferred between computer system and external devices. Examples of communications interface may include a modem, a network interface (such as an Ethernet card), a communications port, a PCMCIA slot and card, etc. Software and data transferred via communications interface are in the form of signals, which may be electronic, electromagnetic, optical or other signals capable of being received by communications interface. These signals are provided to communications interface via a communications path (i.e., channel). This channel carries signals and may be implemented using wire or cable, fiber optics, a phone line, a cellular phone link, an RF link and other communications channels.

In this document, the terms "computer program medium" and "computer usable medium" are used to generally refer to media such as removable storage drive, a hard disk installed in hard disk drive, and signals. These computer program products are means for providing software to computer system. The invention is directed to such computer program products.

Computer programs (also called computer control logic) are stored in main memory and/or secondary memory. Computer programs may also be received via communications interface. Such computer programs, when executed, enable the computer system to perform the features of the present invention as discussed herein. In particular, the computer programs, when executed, enable the processor to perform the features of the present invention. Accordingly, such computer programs represent controllers of the computer system.

In an embodiment where the invention is implemented using software, the software may be stored in a computer program product and loaded into computer system using removable storage drive, hard drive or communications interface. The control logic (software), when executed by the processor, causes the processor to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

IV. Conclusion

While various embodiments of the present invention have been described above, it should be understood that they have been presented by way of example, and not limitation. For example, the operational flows presented in FIGS. 2 AND 3, are for example purposes only and the present invention is sufficiently flexible and configurable such that it may flow in ways other than that shown.

Further, it will be apparent to persons skilled in the relevant art that various changes in form and detail can be made therein without departing from the spirit and scope of the invention. Thus the present invention should not be limited by any of the above-described exemplary embodiments, but should be defined only in accordance with the following claims and their equivalents.

What is claimed is:

1. A method executed by a circuit-switched conferencing server for connecting a plurality of circuit-switch based clients utilizing the circuit-switched conferencing server to a plurality of packet-switch based clients utilizing a packet-switched conferencing server, the method comprising the steps of:

establishing an active connection with the packet-switched conferencing server;

designating one or more of said plurality of circuit-switch based clients as an active speaker on said circuit-switched conferencing server;

creating a list of the designated circuit-switch based clients and limiting the number of designated circuit-switch based clients;

receiving over the active connection a first combined audio packet from the packet-switched conferencing server, wherein the first combined audio packet is a mixture of audio packets received from each of the packet-switch based clients who have been designated as an active speaker by the packet-switched conferencing server;

converting the first combined audio packet to a format that the plurality of circuit-switch based clients can receive;

receiving a plurality of audio packets from each of the designated circuit-switch based clients, wherein said plurality of audio packets comprises a second combined audio packet;

mixing said first combined audio packet and said second combined audio packet into a composite audio packet;

forwarding said composite audio packet to each of the plurality circuit-switch based clients, wherein for each designated circuit-switch based client of the plurality of circuit-switch based clients, said designated circuit-switch based client receives the composite audio packet without an audio packet that had been transmitted from the designated circuit-switch based client to the circuit-switched conferencing server;

converting said second combined audio packet to a format that the plurality of packet-switch based clients can receive;

forwarding, over said connection, said second combined audio packet to said packet-switched conferencing server;

wherein the circuit-switched conferencing server is independent from the packet-switched conferencing server; and wherein said plurality of circuit-switch based clients and said plurality of packet-switch based clients, using varying equipment and protocols, can simultaneously participate in a single audio conference application.

2. The method of claim 1, wherein said plurality of circuit-switch based clients comprising phone based clients.

3. A method executed by a packet-switched conferencing server for connecting a plurality of packet-switch based clients utilizing the packet-switched conferencing server to a plurality of circuit-switch based clients utilizing a circuit-switched conferencing server, the method comprising the steps of:

establishing an active connection with the circuit-switched conferencing server;

designating one or more of said plurality of packet-switch based clients as an active speaker on said packet-switched conferencing server;

creating a list of the designated packet-switch based clients and limiting the number of designated packet-switch based clients;

receiving over the active connection a first combined audio packet from the circuit-switched conferencing server, wherein the first combined audio packet is a mixture of audio packets received from each of the circuit-switch based clients who have been designated as an active speaker by the circuit-switched conferencing server and is converted to a format that the plurality of packet-switch based clients can receive;

receiving a plurality of audio packets from each of the designated packet-switch based clients, where said plurality of audio packets comprises a second combined audio packet;

mixing said first combined audio packet and said second combined audio packet into a composite audio packet;

forwarding said composite audio packet to each of the plurality of packet-switch based clients, wherein for each designated packet-switch based client of the plurality of packet-switch based clients, said designated packet-switch based client receives the composite audio packet without an audio packet that had been transmitted from the designated packet-switch based client to the packet-switched conferencing server;

forwarding, over said connection, said second combined audio packet to said circuit-switched conferencing server;

wherein the circuit-switched conferencing server is independent from the packet-switched conferencing server; and wherein said plurality of circuit-switch based clients and said plurality of packet-switch based clients, using varying equipment and protocols, can simultaneously participate in a single audio conference application.

4. The method of claim 3, wherein said plurality of circuit-switch based clients comprising phone based clients.

* * * * *